June 13, 1939.   L. B. HUNTINGTON, JR   2,162,173
ADJUSTABLE CRANK STRUCTURE
Filed Feb. 17, 1938   2 Sheets-Sheet 2
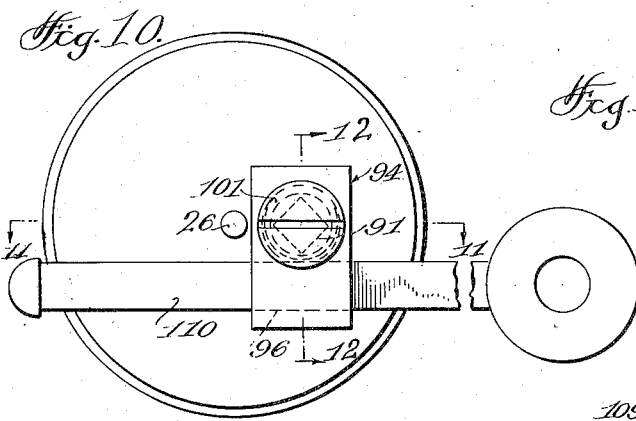
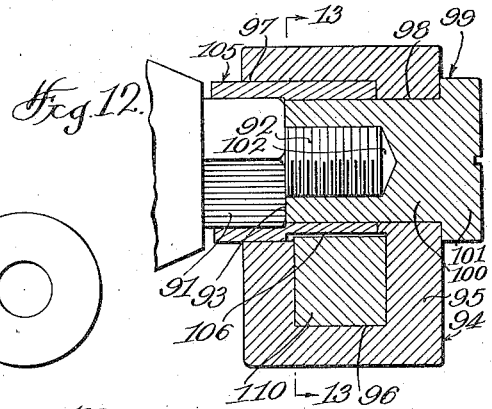
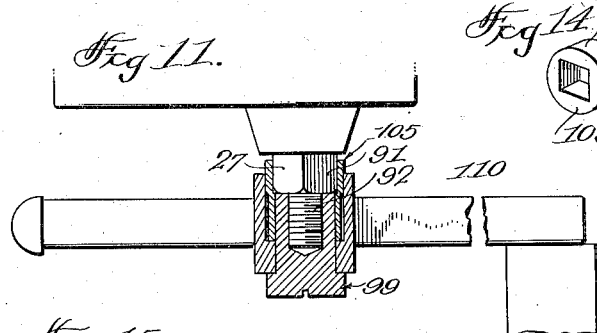
Inventor
Levin B. Huntington, Jr.
By Kimmel & Crowell
Attorneys Patented June 13, 1939

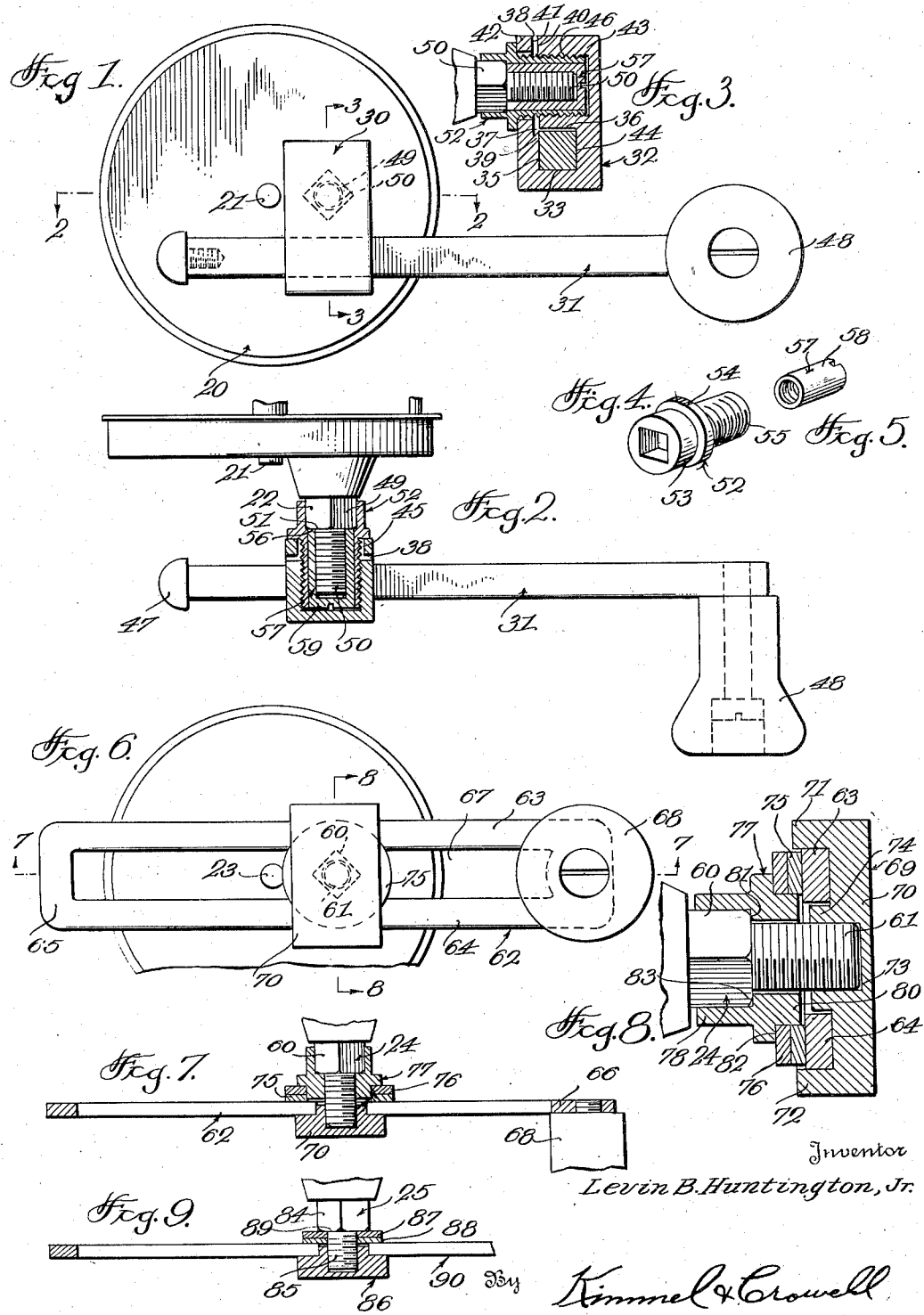

2,162,173

UNITED STATES PATENT OFFICE 2,162,173

ADJUSTABLE CRANK STRUCTURE

Levin B. Huntington, Jr., Baltimore, Md.

Application February 17, 1938, Serial No. 191,103

11 Claims. (Cl. 74—546)

This invention relates to an adjustable crank structure of that type for rotating shafts, and is designed primarily for use with the winding and unwinding shafts of the spools of fishing reels, but it is to be understood that the crank structure, in accordance with this invention is for use in any connection for which it may be found applicable.

The invention has for its object to provide, in a manner as hereinafter set forth, a crank structure of the type referred to, including a revoluble crank arm adjustable for varying the leverage thereof on the shaft with which the structure is associated and whereby the movement of the arm in one direction is utilized to clamp the arm in its adjusted position.

The invention has for its object to provide, in a manner as hereinafter set forth, a crank structure of the type referred to, including a revoluble crank arm adjustable for varying the leverage thereof on the shaft with which the structure is associated and with the structure so set up relative to the shaft whereby the clockwise movement of the arm is utilized to lock the arm in its adjusted position.

The invention has for its further object to provide, in a manner as hereinafter set forth, a crank structure of the type referred to, including a revoluble crank arm adjustable for varying the leverage thereof on the shaft with which the structure is associated and with the structure so set up relative to the shaft whereby the anti-clockwise movement of the arm is utilized to lock the arm in its adjusted position.

The invention has for its further object to provide, in a manner as hereinafter set forth, a revoluble crank structure of the type referred to, adjustable for varying the leverage thereof on the shaft with which it is associated, and with the structure so set up relative to the shaft whereby the clockwise movement of the structure is utilized to lock the structure in its adjusted position and the anti-clockwise movement of the structure is utilized to release the structure from its adjusted position.

The invention has for its object to provide, in a manner as hereinafter set forth, a revoluble crank structure of the type referred to, adjustable for varying the leverage thereof on the shaft with which it is associated and with the structure including means carried by the shaft and acting on the clockwise and anti-clockwise movement of the structure for locking the structure in its adjusted position and whereby the said means when in a given position will release the structure from its adjusted position.

Further objects of the invention are to provide, in a manner as hereinafter set forth, a crank structure for the purpose referred to which is simple in its construction and arrangement, strong, durable, compact, conveniently adjusted, thoroughly efficient in its use, readily assembled and comparatively inexpensive to manufacture.

Embodying the objects aforesaid and to others which may hereinafter appear, the invention consists of the novel construction, combination and arrangement of parts as will be more specifically described and illustrated in the accompanying drawings, wherein are shown embodiments of the invention, but it is to be understood that changes, variations and modifications may be resorted to which fall within the scope of the invention as claimed.

In the drawings:

Figure 1 is a side elevation of a crank structure, in accordance with this invention showing the adaptation thereof, by way of example in connection with the driving shaft for the winding shaft of a fishing reel, Figure 2 is a section on line 2—2, Figure 1, Figure 3 is a section on line 3—3, Figure 1, Figure 4 is a perspective of the adapter element of the structure, Figure 5 is a perspective view of the spacing element for the adapter element, Figure 6 is a side elevation of a modified form as applied by way of example to the driving shaft for the winding shaft of a fishing reel, Figure 7 is a section on line 7—7, Figure 6, Figure 8 is a section on line 8—8, Figure 6, Figure 9 is a fragmentary view in horizontal section of another modified form, Figure 10 is a fragmentary view of still another modified form as applied by way of example to the driving shaft for the winding shaft of a fishing reel, Figure 11 is a section on line 11—11, Figure 10, Figure 12 is a section on line 12—12, Figure 10, Figure 13 is a section on line 13—13, Figure 12, Figure 14 is a perspective view of the cam element forming a part of the crank structure shown by Figure 10, Figure 15 is a fragmentary view in side elevation of still another modified form as applied by way of example to the driving shaft for the winding shaft of a fishing reel, Figure 16 is a section on line 16—16, Figure 15, Figure 17 is a section on line 17—17, Figure 16, and Figure 18 is a perspective view of the crank arm carrier forming a part of the crank structure shown in Figure 15.

The crank structure may or may not be connected directly to the winding shaft, but preferably it is connected with such shaft through the means of a transmission, not shown operated by a driving shaft to which the crank structure is attached. The several embodiments of the invention are shown as applied to a fishing reel, yet it is to be understood that an adjustable crank structure, in accordance with this invention is for employment in connection with any device for which it is found applicable.

With reference to Figures 1 and 2, a fishing reel is generally indicated at 20, the winding shaft thereof at 21 and driving shaft 22. As is well known, certain reel structures, each has its winding shaft 21 operated by a transmission driven from the shaft 22. The transmission is not shown. The foregoing statement applies to Figures 6, 8, 9, 10, 11, 15 and 16. In Figures 6 and 8 the winding and driving shafts of the reel are designated 23, 24 respectively; in Figure 9 the driving shaft is indicated at 25; in Figures 10, 11 the winding and driving shafts are indicated at 26, 27 respectively; and in Figures 15 and 16 the winding and driving shafts are indicated at 28, 29 respectively.

With reference to Figures 1 to 5 the crank structure includes a carrier element 30 and a crank or lever arm 31 slidably mounted in and capable of being adjusted relative to element 30 to vary the distance between its ends and the sides of the element 30 for varying the leverage of the arm 13, when desired which is to be applied to the shaft 21. The element 30 includes an upstanding body part 32 which is formed transversely and in proximity to its lower end with a passage 33 opening at the side edges thereof. The shape of passage 33 will correspond to the cross sectional contour of arm 31, and such contour is shown by way of example as square. The shape of passage 33 and the cross sectional contour of arm 31 will be such as to prevent the latter revolving relative to element 30. The upper end of the side wall 35 of passage 33 is spaced from one end of the top wall 36 of the passage to form an opening 37. The body part 32 is formed with a transverse groove 38 having its base wall 39 arranged below the top wall 36 of passage 33. The groove 38 opens at the sides and top of body part 32. The base wall 39 of groove 38 merges into the upper end of the wall 35 of passage 33. The lower end of the side wall 40 of groove 38 merges into that end of the top wall 36 of passage 33 which aligns with the upper end of the wall 35 of the passage. The other side wall of groove 38, indicated at 41 has its lower end arranged below and in proximity to the upper end of wall 35 of said passage. The opening 37 in connection with the groove 38 forms the body part 32 with a pair of clamping portions 42, 43. The latter, by a means to be referred to is to be shifted towards the portion 42 for the purpose of binding the side wall 44 of passage 33 against the arm 31 for locking the latter in its adjusted position relative to element 30. The portion 42 is formed with an opening 45 which communicates with groove 38. The portion 43 is provided with a screw threaded socket 46 opening into groove 38 and aligning with opening 45. The socket is arranged above the passage 33. The arm 31 has secured to one end thereof a removable stop 47 and at its other end a handle-piece or hand grip 48.

The shaft 22 has a portion thereof extended from the reel 20 and such portion consists of a polygonal-shaped part 49 and a peripheral threaded part 50. The latter is of circular cross section and is of less diameter than the part 49. The part 50 is integral with the outer face of part 49 centrally of the latter whereby the junction of the parts 49, 50 will provide a shoulder 51. The part 49 is of less length than part 50.

The crank structure includes an adapter element 52 of tubular form and which consists of an end part 53, an intermediate part 54 and an end part 55. The part 53 is of greater outer diameter and of less length than the part 55. The part 54 is of greater outer diameter and of less length than the part 53. The inner diameter of the parts 54, 55 are the same. The inner diameter of the part 53 is greater than the inner diameter of the part 54 whereby the junctions of the such diameters will form element 52 with an internal shoulder 56. The inner face of part 53 is of polygonal contour and corresponds in contour to the part 49 of the extended portion of the shaft 22. The part 53 forms a socket for a purpose to be referred to. The part 55 is peripherally threaded throughout. The element 52 provides a means for moving said portion 43 of element 30 to and from clamping relation with respect to arm 31.

The crank structure includes a spacer element 57 for the part 54, 55 of element 52. The element 57 consists of an internally threaded tubular body 58 having one of its ends open. The other end of body 58 is closed as at 59. The element not only constitutes a spacer for the parts 54, 55 of element 52, but also a socket for a purpose to be referred to.

The construction and arrangement of the crank structure is such that when the shaft 22 is operated clockwise by the arm 31, the latter will be locked in its adjusted position and when shaft 32 is operated anti-clockwise by the arm 31, the latter will be released from its locked adjusted position. The elements of the structure and the extended portion of the shaft 22 are arranged in the hereinafter referred to manner to accomplish the locking and releasing of arm 31. The part 55 of adapter element 52 is extended through opening 45 into the socket 46 and threadedly engages with the threads on the wall of the latter. The part 54 of element 52 seats on the carrier 30 and arrests the extent of the inward movement of part 55. The arm 31 is then adjusted to position the handle piece 48 the necessary distance from carrier 30 to obtain the leverage desired for shaft 22. The element 57 is then positioned on the part 50 of shaft 22 and abuts shoulder 51. The element 57 forms a socket for receiving part 50. The extended portion of shaft 22, with element 57 thereon is then extended into the element 52 with the part 49 of such portion seated in the socket formed by the part 53 of element 52. As the latter is secured to the carrier 30, when arm 31 is revolved in a clockwise direction, the coaction of the parts 49, 53 will provide for the rotating of shaft 22 in a like direction whereby the coaction of the threads on carrier 30 and element 52 will cause the portion 43 of the carrier to move towards the carrier portion 42 to bind against arm 31 and lock it in its adjusted position. On the revolving of the arm 31 in an anti-clockwise direction, shaft 32 will be operated in a like direction whereby the carrier portion 43 will be moved away from carrier portion 42 and release arm 31.

With reference to Figures 6 to 8 the shaft 24 has an extended portion similar in form to that of the extended portion of shaft 22. The parts 60, 61 of the extended portion of shaft 24 correspond to the parts 49, 50 respectively of shaft 22. The crank or lever arm of the form of crank structure shown by Figures 6 to 8 is flat, indicated at 62 and of the slotted type to form a pair of side members 63, 64 and a pair of end members 65, 66. The slot in arm 62 is disposed lengthwise of the latter and indicated at 67. The end member 66 has secured thereto a handle piece or hand grip 68.

The form shown in Figures 6 to 8 includes a carrier 69 formed of an upstanding rectangular body part 70 having extending inwardly from and at right angles to the upper and lower end of its inner face a pair of spaced superposed aligned flanges 71, 72. The inner face of body part 70 centrally thereof is formed with a threaded socket 73 and an internally threaded collar 74 which forms a continuation of the threaded wall of socket 73. The flanges 71, 72 extend beyond the collar 74. The side member 63 is slidably arranged between the collar 74 and flange 71. The side member 64 is slidably arranged between the collar 74 and flange 72. The members 63, 64 are to abut the inner face of body part 70 and are held in spaced relation by the collar 74. The thickness of the members 63, 64 is greater than the length of collar 74 but less than the width of the flanges 71, 72. Positioned against the members 63, 64 is a binding washer 75 of greater diameter than the width of body part 70. The washer 75 is arranged between the flanges 71, 72 and extends from the opposite sides of the carrier 69. Arranged against the washer 75 is a binding washer 76 of the same inner and outer diameter of the washer 75.

The crank structure shown by Figures 6 to 8 includes an adapter element 77 of tubular form and consisting of an end part 78, an intermediate part 79 and an end part 80. The outer diameters of the parts 78, 80 are the same. The inner diameters of the parts 79, 80 are the same. The outer diameter of the part 79 is greater than the outer diameters of the parts 78, 80. The inner diameter of the part 77 is greater than the inner diameters of the parts 78, 80. The junction of the part 77 with the part 79 forms the inner face of element 77 with a shoulder 81. The junction of the part 79 with the part 80 forms the element 77 with a shoulder 82 on its outer periphery. The inner face of the part 78 is of polygonal contour and which is to correspond in contour to the polygonal contour of the part 60 of the shaft 24. The part 78 of element 77 provides a socket for receiving the part 60 of shaft 24. The parts 60, 61 of the shaft 24 pass through the element 77 and the said part 61 has threaded engagement with the threads of collar 74 and the wall of socket 73. The washers 75, 76 are mounted on part 80 of element 77 and with the washer 76 abutting the peripheral shoulder 82. The part 79 of element 77 is of less length than the parts 78, 80 of such element. The part 78 is of greater length than part 80.

The crank structure shown in Figures 6 to 8 is to be assembled in the manner as shown in Figure 8 and after assembled the arm 62 is then adjusted to the desired extent. The shaft 24 is revolved clockwise by revolving arm 62 in a like direction. The shaft 24 is caused to follow the movement of the arm 62 by the coaction of the parts 60, 78, and will provide, due to the coaction of its threaded part 61 with the threaded collar and socket, the moving of the carrier towards the adapter element 77 whereby a clamping action will be had on the arm 62 and the latter will be locked in its adjusted position. This clamping action is had due to the arrangement of the binding washers with respect to the shoulder 82 and the side members of the arm 62. The shoulder 83 formed by the junction of the parts 60, 61 of the shaft 24 will coact with the shoulder 81 to arrest the inward shift of the adapter element 77. The shoulders 82 and 83 constitute abutments. On revolving arm 62, in an anti-clockwise direction, it will be released from its adjusted position.

The form of crank structure shown in Figure 9 will be the same as the form shown in Figure 7 with the exception that an adapter element is not used, the binding washers are directly mounted on the shaft 25 and such washers are of smaller diameter than the binding washers 75, 76. Otherwise than as stated, the form of the structure shown by Figure 9 will be same as that shown in Figure 7. In Figure 9 the parts 84, 85 of shaft 25 correspond to the parts 60, 61 of shaft 24. The carrier 86 of the form shown in Figure 9 corresponds to the carrier 69. The binding washers, Figure 9 are designated 87, 88. The washer 87 abuts shoulder 89 on shaft 25 and the washer 88 abuts the sides of the crank or lever arm 90. The latter is of the same form as the arm 62. The form shown in Figure 9 is of the type which locks the arm 90, in its adjusted position on the clockwise movement of the arm and releases the arm from its adjusted position on the anti-clockwise movement of the arm. With reference to the form shown by Figures 10 to 14, the shaft 27 has an extended portion formed with parts 91, 92 which correspond to the parts 49, 50 of shaft 22. The junction of the parts 91, 92 forms a shoulder 93. The form shown by Figures 10 to 14 includes a carrier element 94 comprising a rectangular body part 95 provided transversely with a passage 96 opening at each side thereof. The body part 95 is also formed with an opening 97 extending inwardly from one side thereof and intersecting the top of passage 96. The body part 95 is further formed with an opening 98 extending inwardly from the other side thereof. The inner ends of the openings 97, 98 communicate with each other. The opening 97 is of greater diameter and length than opening 98. The axes of the openings 97, 98 align and are aligned with the axis of shaft 27 when the crank structure is set up. Extending through the opening 98 and into the opening 97 is an adapter element 99 consisting of a body part 100 of circular cross section. The outer end of body part 100 is formed with a head 101 for abutting against the front of the body part 95 of the carrier 94. The element 99 is provided lengthwise thereof with a screw threaded socket 102 which opens at its inner end.

Extending into the opening 97 from the inner face of body part 95 is a tubular locking element 103 formed of an outer part 104 and an inner part 105. The latter has a portion 106 arranged concentrically with respect to the portion 107 of part 104 and a portion 108 which is disposed eccentrically to the portion 107 of part 104. The inner face of part 104 is of polygonal contour and such part 104 forms a socket for receiving the part 91 of the shaft 27. The said part 91 is also of polygonal contour and which conforms in contour to the socket provided by the inner face of part 104. By this arrangement, when the parts 91, 104 are interengaged, the shaft 27 and element 103 bodily move together. The part 92 of shaft 27 extends into the socket 102 and threadedly engages with the wall of the latter whereby elements 99 and 103 bodily move together. The inner diameter of the part 105 of element 99 is uniform throughout. The element 99 may be termed a locking cam as it includes a high part provided by the portion 106 and a low part formed by the portion 108. The wall of opening 97 forms a bearing for the portions 106, 107 and 109 of element 99. The portion 106 is always clear of the wall of opening 97. The portion 106 is employed for locking the crank or lever arm 110 in its adjusted position. The portion 108 is employed for releasing the arm 110 from its adjusted position. The arm 110 is slidably mounted on the passage 96. The contour of the latter conforms to the contour of the arm 110 in transverse cross section. The cross sectional contour of the arm 110 is polygonal. The arm 110 is of the same form as the arm 21.

It will be assumed that the form shown by Figures 10 to 14 are arranged in the manner as set forth by Figures 12 and 13 and such arrangement is when the arm 110 is in released position to enable it to be adjusted relative to the carrier 94. After arm 110 has been adjusted, it is moved in a clockwise direction bodily moving the carrier therewith. The clockwise movement is continued until the arm comes into contact with the portion 106 of element 103 which locks the arm 110 in its adjusted position. Arm 110 will be locked in its adjusted position during further clockwise movement thereof, but it may be released from its adjusted position on an anti-clockwise direction of movement given thereto. It is to be understood that the arm 110 may be locked from the position shown in Figure 12 on an anti-clockwise movement of the arm and released on a clockwise movement thereof. When releasing by an anti-clockwise movement or by a clockwise movement such movement is to be less than a complete revolution.

The form of crank structure shown by Figures 15 to 18 includes the shaft 29 having parts 111, 112 which are of the same form as the parts 49, 50 of the shaft 22. The junction of the parts 111, 112 provide the shoulder 113. A carrier is indicated at 114 and it includes a passage 115, a groove 116 and an opening 117 of the same form and arrangement as the passage 33, groove 38 and opening 45 of the carrier 32. The carrier 114 is formed with a socket 118 having its mouth or open end partly aligning in spaced relation with the opening 117. The carrier 114 is also provided with an opening 119 which communicates with the socket 118 through the base end of the latter. Extending through the opening 119 and into the socket 118, as well as abutting shoulder 113, when the parts of the structure shown in Figure 16 are assembled, is an adapter element 120 formed with a head 121 at its outer end which abuts the front face of the carrier. The element 120 is formed lengthwise thereof with a screw threaded socket 122 which opens at the inner end thereof. The part 112 of shaft 29 threadedly engages with the wall of socket 122 when carrier 114 is arranged in coacting relation with respect to shaft 29. The crank structure shown by Figures 15 to 18 includes a locking element 123 of the same form and arrangement as the locking element 103 employed in the crank structure shown by Figures 10 to 13. The element 123 is what may be termed a locking cam. The high and low parts of element 123 are indicated at 124, 125 respectively. The crank or lever arm is indicated at 126 and it is of the same form as the arm 21. The passage 115 and groove 116 forms the carrier with spaced portions 127, 128. The element 123 is arranged relative to the shaft 29 and element 120 as element 103 is set up with respect to shaft 27 and element 99.

For the purposes of an understanding of the operation of the form of the invention shown in Figure 16, the high part 124 of the element 123 is most remote from the axis of rotation. As shown in Figure 16 the high part 124 is at its greatest distance from the wall A of the passage 115. At this time the wall A will, due to the resiliency of the carrier 114, be sprung slightly away from the opposite wall B of the passage 115 and the arm 126 can slide freely in the passage 115. Considering that the shaft 29 is under restraint against rotation and that the element 123 is non-rotatable with respect to this shaft, it will be seen that if the arm 126 be rotated the passage 115 will move around the element 123. This causes the wall A to approach a position opposite the high part element 123 and by so doing the portion C of the carrier 114 is moved away from the axis of rotation. This moves the wall A slightly towards the wall B and clamps or locks the arm 126 in its adjusted position.

What I claim is:

1. In a revoluble adjustable crank structure for revolving and varying the leverage on a shaft, a carrier, a clockwise and anti-clockwise revoluble crank arm slidably mounted in the carrier, bodily moving the carrier therewith and capable of being adjusted to vary the distance between the ends thereof and the carrier for varying the leverage of the arm on the shaft, an adapter element for connecting the carrier to the shaft for revolving the latter, and said carrier being provided with parts coacting with said adapter element for locking said arm in its adjusted position on the clockwise movement of the arm.

2. In a revoluble adjustable crank structure for revolving and varying the leverage on a shaft, a carrier, a clockwise and anti-clockwise revoluble crank arm slidably mounted in the carrier, bodily moving the carrier therewith and capable of being adjusted to vary the distance between the ends thereof and the carrier for varying the leverage of the arm on the shaft, means adapted to connect the carrier to the shaft for revolving the latter, and said carrier being formed with parts coacting with said means for locking said arm in its adjusted position on the clockwise movement of the arm and for releasing the arm from its adjusted position on the anti-clockwise movement of the arm.

3. In a revoluble adjustable crank structure for revolving and varying the leverage on a shaft, a carrier, a clockwise and anti-clockwise revoluble crank arm slidably mounted in the carrier, bodily moving the carrier therewith and capable of being adjusted to vary the distance between the ends thereof and the carrier for varying the leverage of the arm on the shaft, an adapter element extending into the carrier for connecting it to the shaft for revolving the latter, and said carrier being formed with parts coacting with said adapter element for locking said arm in its adjusted position on the clockwise movement of the arm and for releasing the arm from its adjusted position on the anti-clockwise movement of the arm.

4. In a revoluble adjustable crank structure for revolving and varying the leverage on a shaft, a carrier, a revoluble crank arm slidably mounted in the carrier, bodily moving the carrier therewith and capable of being adjusted to vary the distance between one of its ends and the carrier for varying the leverage of the arm on the shaft, means for connecting the carrier to the shaft for revolving the latter, and means coacting with said connecting means for releasably locking the arm in its adjusted position on one direction of revolution of the arm and for maintaining said arm locked on a continuance of the movement of the arm in such direction.

5. In a revoluble adjustable crank structure for revolving and varying the leverage on a shaft, a carrier, a revoluble crank arm slidably mounted in the carrier, bodily moving the carrier therewith and capable of being adjusted to vary the distance between one of its ends and the carrier for varying the leverage of the arm on the shaft, means for connecting the carrier to the shaft for revolving the latter, and means coacting with said connecting means for releasably locking the arm in its adjusted position on one direction of revolution of the arm and for maintaining said arm locked on a continuance of the movement of the arm in such direction and for releasing said arm when the latter is revolved in an opposite direction.

6. In a revoluble adjustable crank structure for revolving and varying the leverage on a shaft, a carrier provided with a threaded socket, a revoluble crank arm slidably mounted in the carrier, bodily moving the carrier therewith and capable of being adjusted to vary the distance between one of its ends and the carrier for varying the leverage of the arm on the shaft, an adapter element for connecting the shaft to the carrier, said element extending into and threadedly engaging with said socket, and means coacting with said element for releasably locking the arm in its adjusted position to the carrier on one direction of revolution of the arm and for maintaining the arm locked on a continuance of the movement of the arm in such direction and for releasing said arm from its locked position when the arm is revolved in an opposite direction.

7. In a revoluble adjustable crank structure for revolving and varying the leverage on a shaft, a carrier provided with a threaded socket, a revoluble crank arm slidably mounted in the carrier, bodily moving the carrier therewith and capable of being adjusted to vary the distance between one of its ends and the carrier for varying the leverage of the arm on the shaft, an adapter element for connecting the shaft to the carrier, said element extending into and threadedly engaging with said socket, and means coacting with said element for releasably locking the arm in its adjusted position to the carrier on one direction of revolution of the arm and for maintaining the arm locked on a continuance of the movement of the arm in such direction and for releasing said arm from its locked position when the arm is revolved in an opposite direction, the said means including a shiftable split part of the carrier.

8. In a revoluble adjustable crank structure for revolving and bearing the leverage on a shaft, a carrier, a revoluble crank arm slidably mounted in the carrier, vitally moving the carrier therewith and capable of being adjusted to vary the distance between one of its ends and the carrier for varying the leverage of the arm on a shaft, means for connecting the carrier to the shaft, and means for locking said arm in its adjusted position to the carrier on one direction of revolution of the arm and for maintaining the arm locked on a continuance of the movement of the arm in such direction, the said last mentioned means including a shiftable split part of the carrier.

9. In a revoluble adjustable crank structure for revolving and bearing the leverage on a shaft, a carrier, a revoluble crank arm slidably mounted in the carrier, vitally moving the carrier therewith and capable of being adjusted to vary the distance between one of its ends and the carrier for varying the leverage of the arm on a shaft, means for connecting the carrier to the shaft, and means for locking said arm in its adjusted position to the carrier on one direction of revolution of the arm and for maintaining the arm locked on a continuance of the movement of the arm in such direction, the said last mentioned means including an adapter for connection to the shaft and binding washers interposed between the adapter and said arm.

10. In a revoluble adjustable crank structure for revolving and bearing the leverage on a shaft, a carrier, a revoluble crank arm slidably mounted in the carrier, vitally moving the carrier therewith and capable of being adjusted to vary the distance between one of its ends and the carrier for varying the leverage of the arm on a shaft, means for connecting the carrier to the shaft, and means for locking said arm in its adjusted position to the carrier on one direction of revolution of the arm and for maintaining the arm locked on a continuance of the movement of the arm in such direction, the said last mentioned means including a locking element in the form of a cam having a portion formed of a high and a low part and a portion for connecting the shaft therewith, said locking element extending into the carrier.

11. In a revoluble adjustable crank structure for revolving and bearing the leverage on a shaft, a carrier, a revoluble crank arm slidably mounted in the carrier, bodily moving the carrier therewith and capable of being adjusted to vary the distance between one of its ends and the carrier for varying the leverage of the arm on a shaft, means for connecting the carrier to the shaft, means for locking said arm in its adjusted position to the carrier on one direction of revolution of the arm and for maintaining the arm locked on a continuance of the movement of the arm in such direction, the said last mentioned means including a locking element in the form of a cam extending into the carrier having a portion formed of a high and a low part, a portion for connecting the shaft therewith, and a shiftable split part of the carrier.

LEVIN B. HUNTINGTON, Jr.